April 17, 1934.  H. C. KELLER  1,955,427

CONVEYER MECHANISM

Filed Oct. 11, 1930  4 Sheets-Sheet 1

INVENTOR.
HENRY C. KELLER
ATT'YS

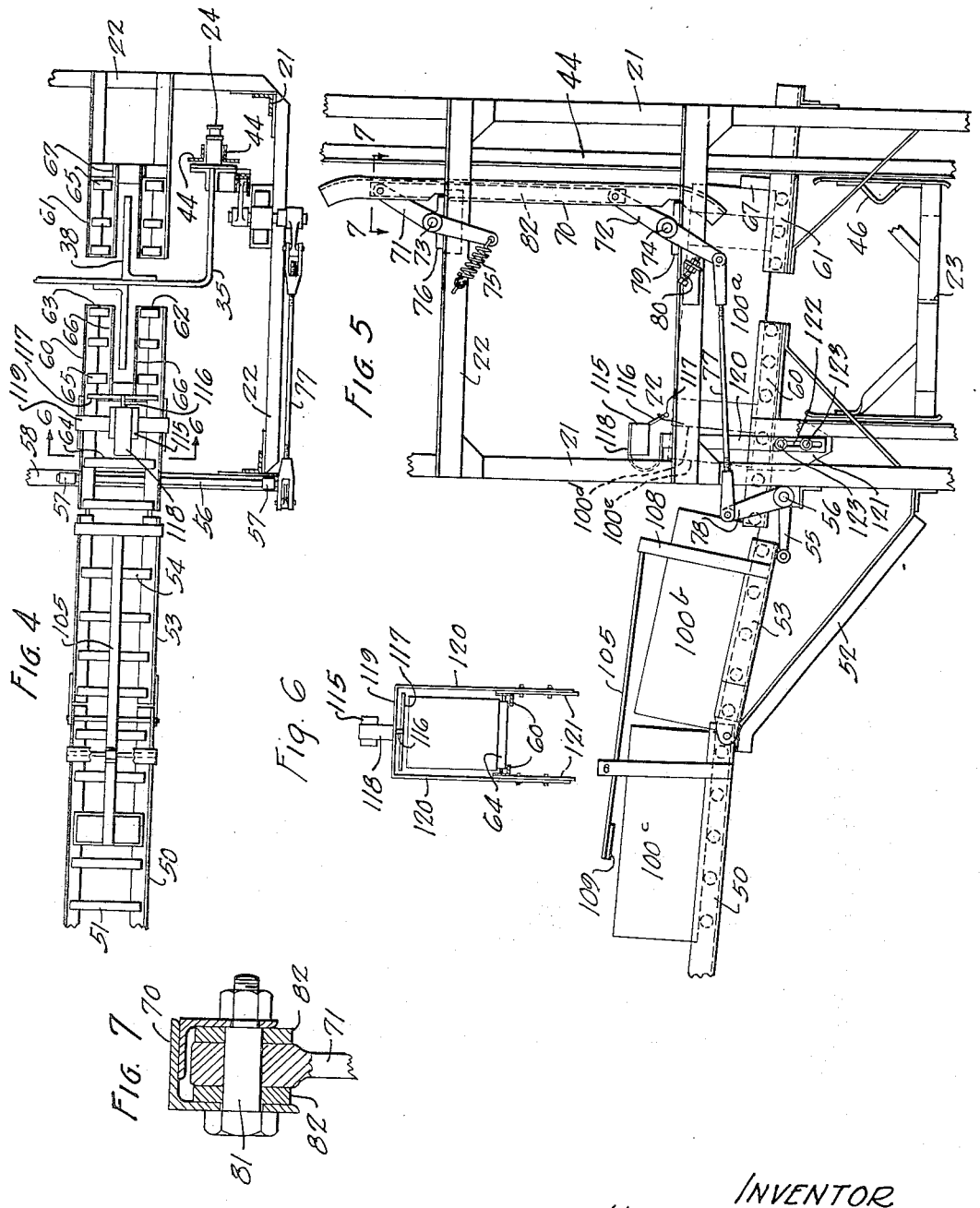

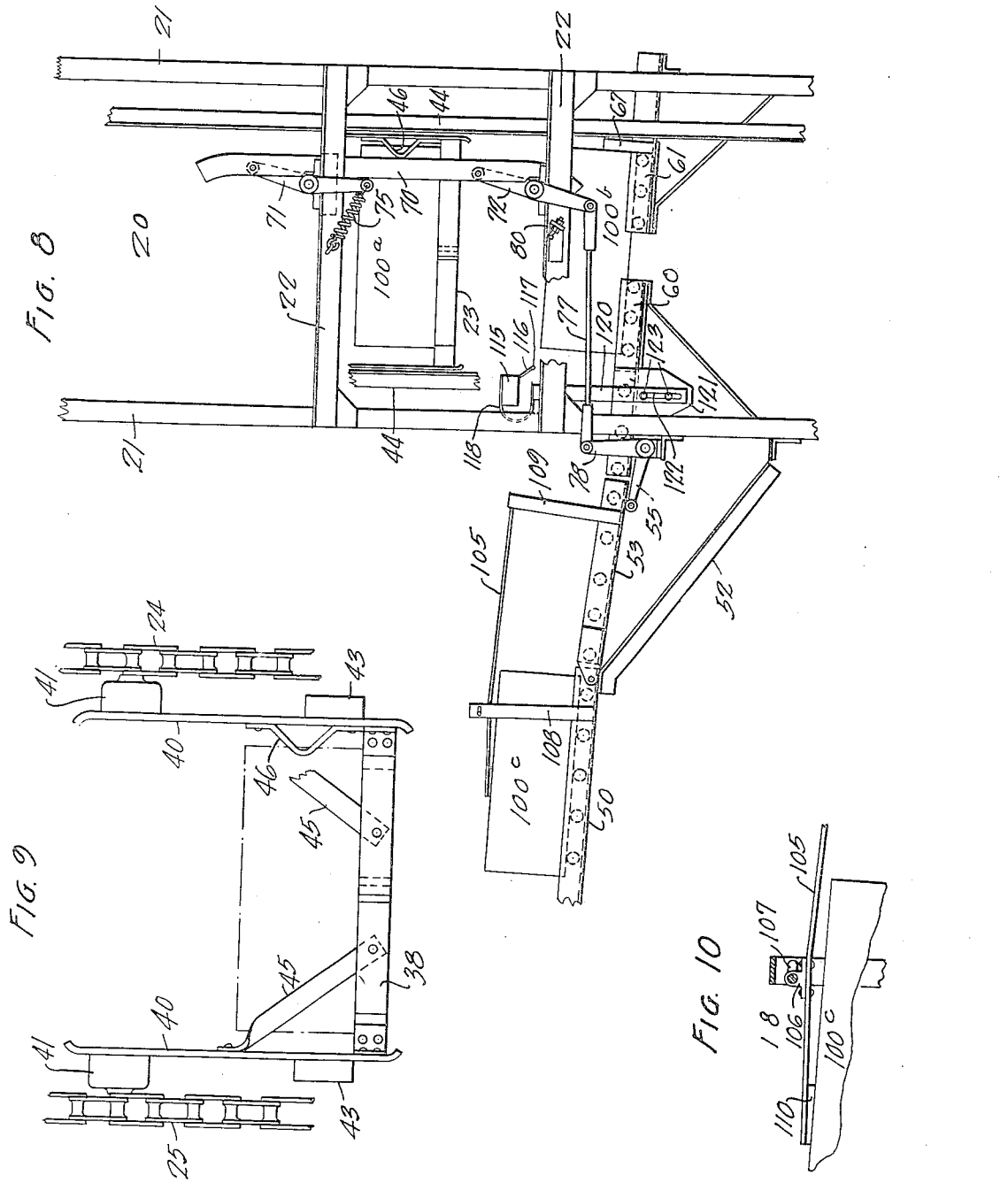

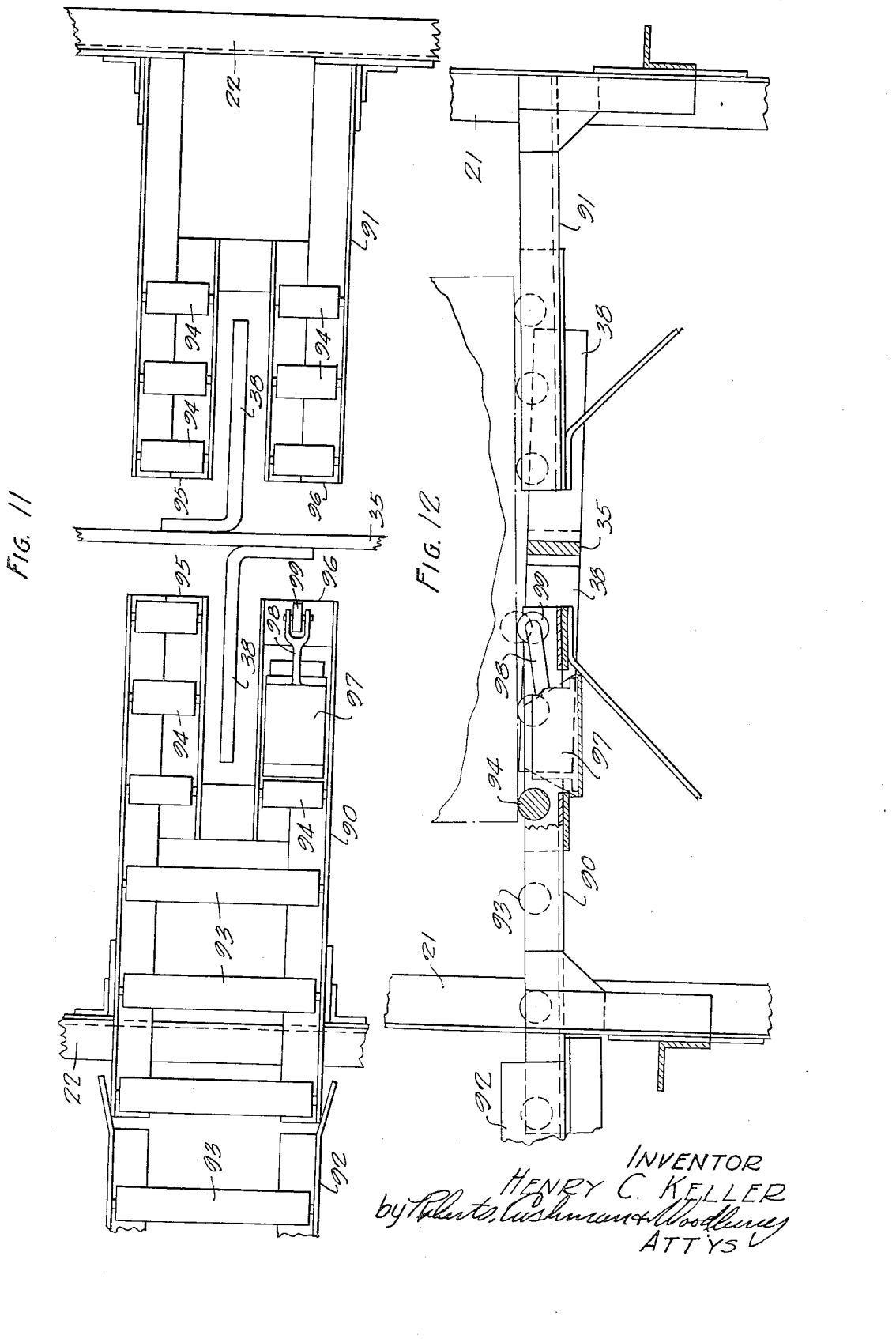

Patented Apr. 17, 1934

1,955,427

UNITED STATES PATENT OFFICE 1,955,427

CONVEYER MECHANISM

Henry C. Keller, Syracuse, N. Y., assignor to The Lamson Company, Syracuse, N. Y., a corporation of Massachusetts Application October 11, 1930, Serial No. 488,027

15 Claims. (Cl. 198—26)

This invention relates to an improvement in conveyer mechanism and more particularly in such mechanism comprising article transporting means in combination with article loading and unloading stations.

One object of this invention is to provide in a conveyer mechanism a plurality of loading stations and a plurality of unloading stations, each loading station associated with a particular unloading station whereby all articles supplied to the conveyer from each loading station are delivered to the associated unloading station, said conveyer including a plurality of cars, each car having a plurality of platforms, one platform coacting with each pair of associated loading and unloading stations.

A further object of this invention is to provide in a conveyer mechanism loading platforms, to each of which the articles to be supplied are delivered in units by a feeding conveyer, and an intermediate section between the feeding conveyer and the platform, such intermediate section being actuated by the load transporting conveyer to receive a load unit from the feeding conveyer and delivering it to the platform.

Other objects will appear from a consideration of the following specification and of the drawings which form a part thereof, and in which:

Fig. 4 is a plan view illustrating a portion of a car at a typical loading station;

Fig. 5 is a side elevation thereof;

Fig. 6 is a sectional view taken along line 6—6 of Fig. 4;

Fig. 7 is an enlarged section taken along the line 7—7 of Fig. 5, illustrating a detail of the construction;

Fig. 8 is a view similar to Fig. 5 illustrating the relation of the elements at the loading station after one article has been removed from the station platform and a second article supplied thereto;

Fig. 9 is an enlarged side elevation of a conveyer car, an article thereon being indicated in dot and dash lines;

Fig. 10 is an enlarged view of a portion of the device employed to control the movement of the articles to the first loading position;

Fig. 11 is a plan view, and Fig. 12 is a side elevation partly in section, illustrating a portion of the car at a platform of a typical unloading station.

Figure 1:
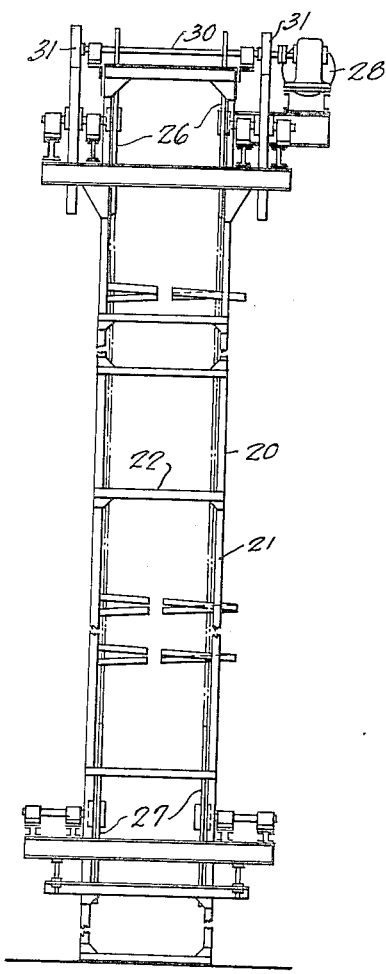
Figs. 1 and 2 are end and side elevations respectively of a vertical conveyer embodying this invention.
Figure 2:
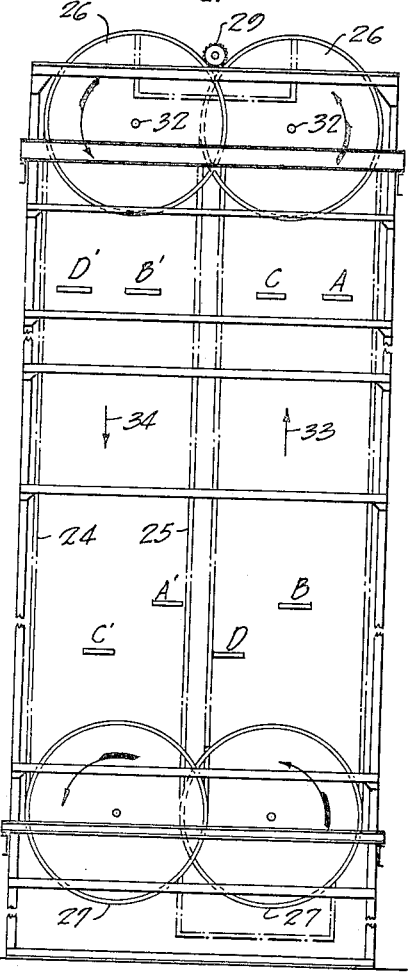

The selected embodiment illustrates a vertical conveyer or elevator consisting of a well 20 formed by a plurality of vertical uprights 21 and crossbars 22 connecting such uprights. The conveyer is of the well-known corner suspension type, the cars being secured at diagonally opposite corners to traveling chains or belts 24, 25. These chains pass over driving pulleys 26 suitably mounted at the head of the well and over driven pulleys 27 suitably mounted at the foot of the well. Motion is transmitted to the driving pulleys 26 from a motor 28 through the gears 29 mounted on a suitably supported shaft 30 and in engagement with gears 31 mounted on the shafts 32 which also carry the pulleys 26. It is well known that in conveyers of this type the cars travel upwardly in one portion of the well and downwardly in the other portion. These portions and the direction of travel of the cars therein are indicated in Fig. 2 by the arrows 33 and 34. Loads are supplied to the cars from various stations during the upward travel of the cars and are delivered therefrom at various stations during the downward travel of the cars.

Figure 3:
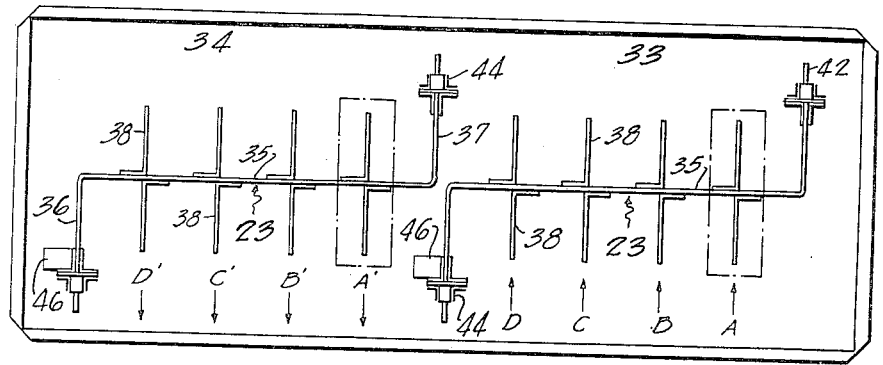
Fig. 3 is a diagrammatic plan view illustrating the location of two of the cars within the conveyer well.

Referring particularly to Figs. 2 and 3, it will be noted that the loading and unloading stations are laterally spaced from one another in separate vertical planes and that they are also, in certain instances, vertically spaced from each other. In the present embodiment the loading stations are designated by the characters A, B, C and D and the unloading stations by the characters A', B', C' and D', the load supplied to the cars at the station A being delivered therefore at station A', that supplied at station B being delivered at station B', etc.

Each car 23, as shown in Figs. 3 to 9 inclusive, comprises a transversely extending bar 35, the ends 36 and 37 whereof are bent at right angles to the body portion and extend outwardly therefrom in opposite directions. Mounted upon the body portion of the bar 35 are bars 38 arranged in pairs and each pair with the portion of the bar 35 forms a support for an article. As illustrated in dotted lines in Fig. 3, the article supported on the bars are spaced from each other so that the car might be described as having a plurality of laterally spaced platforms. At the ends of the bar 35 are secured uprights 40 provided adjacent the upper ends with projections 41 from which extend pins 42 (see Figs. 4 and 9) which act as pivots for two adjacent links of the chains 24 and 25. The uprights 40 are also provided with projections 43 below and in alignment with the projection 41. The projections 41 and 43 travel in the spaces between pairs of vertical angle plates 44, in the usual manner, to prevent any shifting of the car out of its proper position when traveling upwardly or downwardly in the well. This construction is old and well known in vertical conveyers, and is not here shown in detail but appears in Figs. 4 and 5 of the drawings. The uprights 40 are further secured in position by means of angle braces 45 shown in Fig. 9, which extend from the uprights to the ends 36, 37 of the bar 35. Mounted on the inner face of one of the uprights 40 is a projection 46 shown in Fig. 9 as formed of a suitably bent strip of metal. Such projection extends outwardly beyond the upright guides 44 as shown in Fig. 3 for a purpose to be described later in connection with the loading operation of this conveyer.

The loading station shown in Figs. 4 to 8 inclusive comprises a conveyer 50 which may be of any suitable type, being here shown as of the inclined gravity type having freely moving rollers 51 therein. The conveyer 50 terminates at a distance from the well structure and its inner end is supported by suitably arranged braces 52, (see Figs. 5 and 8). Pivotally mounted at the end of the conveyer 50 is a section 53, here shown as of the gravity type having freely rotating rollers 54 which is preferred, although other types might be employed. This section terminates at a distance from the elevator well and rests at its inner end on levers 55 fixed upon a rock shaft 56 carried by bearings 57 on an angle bar 58 secured to two of the uprights 21. Extending into the well of the conveyer is a pair of fixed platforms 60, 61, the adjacent ends whereof are spaced apart in the usual manner to permit the passage of the bars 35 of the cars without interference. The inner ends of the platforms are in the form of separated tongues 62, 63 between which the bars 38 pass freely. The platforms are inclined, as shown in Figs. 5 and 8, and upon them are mounted freely rotating rollers 64, 65, the rollers 64 extending the width of the platforms 60, and the rollers 65 extending inwardly from the outer edges thereof, as shown in Fig. 4, being also supported upon angle plates 66. The platforms 61 are not provided with the rollers 64, but at the inner ends of the rollers 65 are secured a pair of stop plates 67. As will be pointed out later, these stop plates 67 determine the position of the forward end of the article loaded onto the platforms 60, 61. Positioned in the well above each loading platform is a shoe 70 pivotally supported upon arms 71, 72 carried by fixed shafts 73, 74. The portion of the arm 71 extending below the rod 73 is connected by a spring 75 to the crossbar 22 on which the shaft 71 is supported in the bearing 76. The end of the arm 72 extending below the shaft 74 is connected by a link 77 to an arm 78 fixed, as shown in Fig. 4, to one end of the rock shaft 56. The shaft 74 is mounted in a bearing 79 supported by a crossbar 22 and the movement of the arm in one direction is limited by an adjustable set screw 80, as shown in Figs. 5 and 8. It will be noted that the shoe normally takes the position shown in Fig. 5 under the action of the spring 75, being limited by the set screw 80. As shown in Fig. 7, the shoe 70 is preferably made of two angle plates, the flanges of which overlap, and the arm 71 is pivotally connected thereto by a bolt 81, washer strips 82 being provided to space the end of the arm from the walls of the plates. As indicated in dotted lines in Fig. 5, the washer plates 82 are preferably extended so that they act similarly with respect to the connection of the arm 72, which is, it will be understood, connected to the shoe 70 in substantially the same manner.

The unloading stations (see Figs. 11 and 12) in the present embodiment, are located in the part 34 of the conveyer well in which the cars travel downwardly. Each station comprises a pair of platforms 90 and 91 downwardly and outwardly inclined, the platform 90 feeding the articles delivered thereto onto a conveyer 92 which abuts the outer end thereof. The platforms and conveyer are provided with freely rotating rollers 93 and 94. The platforms 90 and 91 at their adjacent ends terminate in tongues 95, 96 suitably spaced apart to permit the passage of the bars 38 of the cars, and the rollers 94 are mounted in the tongues, as shown particularly in Figs. 11 and 12. In the tongue 96 of the platform 90 is mounted in front of the roller 94, a circuit control device 97 which may be of any well known type, and may include an arm 98, at the outer end of which is mounted a roller 99. The arm 98 is pivotally mounted within the casing of the control device and is normally raised into the dotted line position indicated in Fig. 12. The circuit control devices form a part of the circuit by which the motor 28 is operated, and when the arm 98 of any one of these devices is depressed, as shown in full lines in Fig. 12, the circuit is open and the motor stopped from operating.

The operation of the selected embodiment will now be described with particular reference to the loading and unloading platforms. The articles handled by the conveyers are designated by the reference numeral 100, and are here indicated as boxes of a uniform size. The boxes to be loaded at any station are supplied by the feeding conveyer 50, by which they are delivered onto the pivoted section 53 (see Fig. 5), the section 53 being preferably of such length that it will only accommodate one box, the forward end of which rests against the first roller 64 of the platform 60. When a car 23 arrives at the loading station it removes the article 100ª resting on the platforms 60, 61 in contact with the stop 67. As it leaves the platforms 60, 61 the projection 46 on the car contacts with the shoe 70, forcing the shoe forwardly, as shown in Fig. 8, and through the link 77, arm 78 and shaft 56, raising the end of the section 53 into alignment with the platform 60 so that the box 100ᵇ thereon passes onto the platforms 60, 61, as shown in Fig. 8.

In order to avoid any possibility that the box 100ᶜ on the conveyer 50 should also advance onto the platform 60, suitable means are provided for holding the box against such movement. Such means are illustrated in Figs. 5, 8 and 10, and comprise a strap 105 secured to the saddle 106 having a movement of translation controlled by slots 107 in uprights 108 carried by the side walls of the conveyer 50. The inner end of the strap 105 is rigidly secured to a pair of uprights 109 fixed on the side walls of the section 53. Secured to the other end of the strap 105 is a pad 110. Referring to Figs. 5 and 8, it will be noted that when the section 53 is swung downwardly, as shown in Fig. 5, the pad 110 is raised out of contact wth the box 100ᶜ, and the box may advance onto the section. The raising of the section 53 by the arms 55 causes the strap 105 to travel rearwardly and swing on its pivot, bringing the pad 110 into contact with the upper surface of the box 100c so that the box is held in position until the section 53 drops back into the position shown in Fig. 5, which takes place as soon as the projection 46 passes from out of contact with the shoe 70, and the parts then under the action of the spring 75 resume the position shown in Fig. 5.

The boxes supplied at the various loading platforms are carried upwardly to the top of the well and then downwardly until the platform of the car on which the box is placed reaches the unloading platform with which it coacts. On reaching this point the car passes between and through the platforms 90 and 91, leaving the box carried thereby on the rollers 94 of the platforms. The box also contacts with the roller 99 depressing the arm 98 and stopping movement of the motor. The box leaves the platforms 90, 91 under the force of gravity, and as soon as the roller 99 is released it springs back into the dotted line position shown in Fig. 12 and the motor again resumes operation.

At each loading station a circuit control device 115 is provided by which the movement of the conveyer is stopped should the car 23 arrive before the box has taken the proper position upon the loading platform. Two such positions are indicated on Fig. 5 in dotted lines designated by the numerals 100d and 100e. The circuit control device 115 is of the well-known type comprising a casing from which an arm 116 projects into the path of travel of any box out of its normal position when raised by a car. The arm 116 is pivotally supported within the casing and carries at its outer end a rod 117 with which such a box will contact.

The casing is supported upon a spring bar 118 of C-conformation. The bar 118 is carried upon a cross bar 119 fixed on two uprights 120 mounted upon bracket plates 121 depending from the side rails of the platform 60. Each upright 120 has a longitudinally extending slot 122 which receives bolts 123 carried by the plate 121 associated therewith and so located that the uprights are permitted a certain movement of translation.

When the rod 117 is contacted by a misplaced box the circuit control device, which acts as a circuit breaker, is tripped and the motor 28 stopped. The conveyer however does not stop instantaneously and there will be a certain drift of the car before it comes to rest. Such drift might damage the circuit control device and for that reason the spring plate 118 and the sliding monument of the uprights 120 are provided which permit a certain amount of swing and longitudinal travel of the device. The rod 117 as shown in Fig. 6 is located below the cross bar 119 so that even if the box were in the position of 100e the device would be tripped and the motor stopped before the box touches the cross bar 119.

While one embodiment of this invention has been shown and described in detail, it will be understood that I am not limited thereto and that other embodiments may be made without departing from the spirit and scope of the invention as set forth in the following claims.

I claim:

1. In a vertical conveyer mechanism having a plurality of load transporting cars traveling in a well, a station by which loads are supplied to the cars comprising a loading platform within the well, an inwardly inclined feeding conveyer, spaced at its inner end from the loading platform, and a conveyer section pivoted to the inner end of the feeding conveyer and movable in the space, into and out of alignment with said loading platform, said section in the first position facilitating the transfer of a load from the conveyer to the platform.

2. In a vertical conveyer mechanism having a plurality of load transporting cars traveling in a well, a station by which loads are supplied to the cars comprising a loading platform within the well, an inwardly inclined feeding conveyer, spaced at its inner end from the loading platform, and a conveyer section pivoted to the inner end of the feeding conveyer and movable in the space, into and out of alignment with said loading platform, said section in the first position facilitating the transfer of a load from the conveyer to the platform, and in the second position preventing such transfer.

3. In a vertical conveyer mechanism having a plurality of load transporting cars traveling in a well, a station by which loads are supplied to the cars comprising a loading platform within the well, an inwardly inclined feeding conveyer, spaced at its inner end from the loading platform, and a conveyer section pivoted to that end of the feeding conveyer and in alignment therewith at all times and movable in the space into and out of alignment with said loading platform, said section in one position facilitating the transfer of a load from the conveyer to the platform.

4. In a vertical conveyer mechanism having a plurality of load transporting cars traveling in a well, a station by which loads are supplied to the cars comprising a loading platform within the well, an inwardly inclined feeding conveyer, spaced at its inner end from the loading platform, a conveyer section pivoted to the inner end of the feeding conveyer and movable in the space into and out of alignment with said loading platform, said section in the first position facilitating the transfer of a load from the conveyer to the platform, and means actuated by said cars for moving the section into such position.

5. In a vertical conveyer mechanism having a plurality of load transporting cars traveling in a well, a station by which loads are supplied to the cars comprising a loading platform within the well, an inwardly inclined feeding conveyer, spaced at its inner end from the loading platform, a conveyer section pivoted to the inner end of the feeding conveyer and movable in the space into and out of alignment with said loading platform, said section being normally in the second position in which it prevents the transfer of a load from the conveyer to the platform and means actuated by said cars for moving the section into the first position in which it facilitates such transfer.

6. In a vertical conveyer mechanism having a plurality of load transporting cars traveling in a well, a station by which loads are supplied to the cars comprising a loading platform within the well, an inwardly inclined feeding conveyer, spaced at its inner end from the loading platform, a conveyer section pivotally mounted at one end on the inner end of the conveyer and in alignment therewith at all times, movable means by which the other end of the section is normally held out of alignment with the loading platform and means actuated by a car for causing said movable means to shift the conveyer section into alignment with the loading platform in which position it facilitates the transfer of a load to the platform.

7. In a vertical conveyer mechanism having a plurality of load transporting cars traveling in a well, a station by which loads are supplied to the cars comprising a loading platform within the well, an inwardly inclined feeding conveyer, spaced at its inner end from the loading platform, a conveyer section pivotally mounted at one end on the inner end of the conveyer and in alignment therewith at all times, movable means by which the other end of the section is normally held out of alignment with the loading platform, and means actuated by a car for causing said movable means to shift the conveyer section into alignment with the loading platform in which position it facilitates the transfer of a load to the platform, said car actuated means including a shoe pivotally mounted in the conveyer well for engagement with a projection on each car and a connection between the shoe and the section holding means.

8. In a vertical conveyer mechanism having a plurality of load transporting cars traveling in a well, a station by which loads are supplied to the cars comprising a loading platform within the well, an inwardly inclined feeding conveyer, spaced at its inner end from the loading platform, a conveyer section pivotally mounted at one end on the inner end of the conveyer and in alignment therewith at all times, movable means by which the other end of the section is normally held out of alignment with the loading platform, and means actuated by a car for causing said movable means to shift the conveyer section into alignment with the loading platform in which position it facilitates the transfer of a load to the platform, said car actuated means including a shoe pivotally mounted in the conveyer well for engagement with a projection on each car and a positive mechanical connection between the shoe and the section holding means.

9. In a vertical conveyer mechanism having a plurality of load transporting cars traveling in a well, a station by which loads are supplied to the cars comprising a loading platform within the well, an inwardly inclined feeding conveyer, spaced at its inner end from the loading platform, a conveyer section pivotally mounted at one end on the inner end of the conveyer and in alignment therewith at all times, movable means on which the other end of the section rests and by which it is normally supported out of alignment with the loading platform, and means actuated by a car for causing said movable means to raise the end of the section into alignment with the loading platform in which position it facilitates the transfer of a load thereto.

10. In a vertical conveyer mechanism having a plurality of load transporting cars traveling in a well, a station by which loads are supplied to the cars comprising a loading platform within the well, an inwardly inclined feeding conveyer, spaced at its inner end from the loading platform, a conveyer section pivotally mounted at one end on the inner end of the conveyer and in alignment therewith at all times, movable means on which the other end of the section rests and by which it is normally supported out of alignment with the loading platform, and means actuated by a car for causing said movable means to raise the end of the section into alignment with the loading platform in which position it facilitates the transfer of a load thereto, said car actuated means including a shoe pivotally mounted in the conveyer well for engagement with a projection on each car and a connection between the shoe and the section supporting and raising means.

11. In a vertical conveyer mechanism having a plurality of load transporting cars traveling in a well, a station by which loads are supplied to the cars comprising a loading platform within the well, an inwardly inclined feeding conveyer, spaced at its inner end from the loading platform, a conveyer section pivotally mounted at one end on the inner end of the conveyer and in alignmet therewith at all times, movable means on which the other end of the section rests and by which it is normally supported out of alignment with the loading platform, and means actuated by a car for causing said movable means to raise the end of the section into alignment with the loading platform in which position it facilitates the transfer of a load thereto, said car actuated means including a shoe pivotally mounted in the conveyer well in a vertical position for engagement with the projection on each car, pivotally mounted arms upon which the shoe is pivotally mounted and a connection between one of the arms and the section supporting and raising means.

12. In a vertical conveyer mechanism having a plurality of load transporting cars traveling in a well, a station by which loads are supplied to the cars comprising a loading platform within the well, an inwardly inclined feeding conveyer, spaced at its inner end from the loading platform, a conveyer section pivotally mounted at one end on the inner end of the conveyer and in alignment therewith at all times, movable means on which the other end of the section rests and by which it is normally supported out of alignment with the loading platform, and means actuated by a car for causing said movable means to raise the end of the section into alignment with the loading platform in which position it facilitates the transfer of a load thereto, said car actuated means including a shoe pivotally mounted in the well above the loading platform for engagement with a projection on each car and a connection between the shoe and the section supporting and raising means, the engagement of a car with the shoe causing the transfer of the load to the platform for delivery to the succeeding car.

13. In a vertical conveyer mechanism having a plurality of load transporting cars traveling in a well, a station for supplying loads to the cars comprising a loading platform in the well, an inwardly inclined feeding conveyer spaced at its inner end from the loading platform, a movable conveyer section in the space between the feeding conveyer and the platform and pivoted to the inner end of the feeding conveyer, said feeding conveyer supplying loads to the section and the section in one position supplying loads to the platform, and means for clamping the succeeding load on the feeding conveyer when the conveyer section is in the platform supplying position.

14. In a vertical conveyer mechanism having a plurality of load transporting cars traveling in a well, a station for supplying loads to the cars comprising a loading platform in the well, an inwardly inclined feeding conveyer spaced at its inner end from the loading platform, a movable conveyer section in the space between the feeding conveyer and the platform and pivoted to the inner end of the feeding conveyer, said feeding conveyer supplying loads to the section and the section in one position supplying loads to the platform, and means controlled by the conveyer section for clamping the succeeding load on the feeding conveyer when the conveyer section is in the platform supplying position.

15. In a vertical conveyer mechanism having a plurality of load transporting cars traveling in a well, a station for supplying loads to the cars, comprising a loading platform in the well, a feeding conveyer spaced at its inner end from the loading platform, a movable conveyer section in the space between the feeding conveyer and the platform and pivoted to the inner end of the feeding conveyer, said feeding conveyer supplying loads one at a time to the conveyer section when the latter is in one position, and said section when in another position supplying loads one at a time to the loading platform, said section and platform being adapted to accommodate only one load at a time, and means controlled by the section for clamping the succeeding load on the feeding conveyer when the conveyer section is in the first position and for releasing such load when the conveyer section is in the second position.

HENRY C. KELLER.